United States Patent [19]

Ito et al.

[11] Patent Number: 5,075,609
[45] Date of Patent: Dec. 24, 1991

[54] RECORDING APPARATUS

[75] Inventors: Noriaki Ito, Yokohama; Akira Torisawa, Machida, both of Japan

[73] Assignee: Canon Kabushiki Kaisha, Tokyo, Japan

[21] Appl. No.: 531,444

[22] Filed: May 31, 1990

[30] Foreign Application Priority Data

Jun. 9, 1989 [JP] Japan .................................. 1-147126

[51] Int. Cl.$^5$ ............................................... H02P 8/00
[52] U.S. Cl. .................................... 318/696; 318/685; 346/140 R; 400/322; 400/903
[58] Field of Search .............................. 318/696, 685; 346/140 R; 420/322, 903

[56] References Cited

U.S. PATENT DOCUMENTS

| 4,143,980 | 3/1979 | Giebler et al. | 400/322 |
|---|---|---|---|
| 4,602,882 | 7/1986 | Akazawa | 400/322 |
| 4,628,239 | 12/1986 | Everett, Jr. | 400/903 |
| 4,693,618 | 9/1987 | Hanagata | 400/903 |
| 4,838,717 | 6/1989 | Ogura | 400/322 |
| 4,926,196 | 5/1990 | Mizoguchi et al. | 346/140 R |
| 4,928,050 | 5/1990 | Torisawa et al. | 318/696 |
| 4,963,808 | 10/1990 | Torisawa et al. | 318/685 |
| 5,029,264 | 7/1991 | Ito et al. | 318/685 |

FOREIGN PATENT DOCUMENTS 63-291269 11/1988 Japan .

OTHER PUBLICATIONS

English Abstracts of Japan, 62-193548, 8/1987.
English Abstracts of Japan, 62-193549, 8/1987.

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A recording apparatus in which the movement of a recording head for recording scanning is effected includes a carriage carrying the recording head thereon, a step motor for moving the carriage, a linear encoder for detecting the amount of movement of the carriage, the linear encoder being installed over the movement range of the carriage and generating pulse signals in conformity with the amount of movement of the carriage, a controller for counting the pulse signals from the linear encoder and outputting a control signal for the starting and stoppage of the carriage in conformity with the count value, and current switch-over device for switching over and controlling an energization current supplied to the coil of the step motor in conformity with the pulse signals from the linear encoder. The current switch-over device starts the switch-over control of the energization current by an energization control signal from the controller, and stops the switch-over control of the energization current by a stop control signal.

6 Claims, 5 Drawing Sheets

RECORDING APPARATUS

BACKGROUND OF THE INVENTION

1. Field of the Invention

This invention relates to a recording apparatus, and in particular to a serial type recording apparatus which uses a step motor as a drive source to affect the movement of at least a recording head for recording scanning.

2. Related Background Art

In a serial type recording apparatus according to the prior art, a hybrid type or PM (permanent magnet) type step motor or a brushless motor is often used as a carriage driving motor for conveying a recording head for recording scanning.

For example, in the brushless motor, a Hall element, for instance, is usually used for the detection of the positions of the magnetic poles of a rotor for affecting the control of electrical energization and an optical type or magnetic type encoder is used for the detection of the speed of the rotor.

However, such a brushless motor suffers from the following problems:

(1) The alignment of stator magnetic poles an the Hall element is necessary.

(2) If the switching of power supply is affected by the Hall element, the positions of the Hall element and the stator are primarily determined and therefore, the method of electrically energizing the motor is fixed. For example, between a case where so-called 180° energization control is affected and a case where 90° energization control is affected, the position of the Hall element becomes electrically different by 45° relative to the magnetic poles of the stator and therefore, to affect two types of energization controls by a motor, the number of Hall elements must be doubled and the Hall elements must be disposed at positions suitable for the respective energization controls.

For example, Japanese Patent Application Laid-Open No. 62-193548 and Japanese Patent Application Laid-Open No. 62-193549 propose a stepping motor in which energization control is affected by the use of the output of an encoder, but what is disclosed therein is only the structure itself of a motor in which an encoder is provided at a predetermined location, and no disclosure is made of the circuit, method, etc. for the drive control, of the motor.

So, in U.S. Pat. No. 4,963,808, there is proposed a control device for a step motor in which an encoder having portions to be detected an integer number of times as many as the number of the magnetic poles of a rotor is fixed to the shaft of the rotor and at a predetermined location on the stator side, the number of the portions to be detected of said encoder resulting from the rotation of the rotor is counted, whereby the electrical energization of the coil of the stator is switched over when the count value coincides with a predetermined value. Heretofore, the drive control of a step motor has been affected by simply open-loop-controlling the frequency of the same pulse as the driving pulse number of the motor. However, where a step motor is used as a carriage driving motor and is driven under open loop control, when the carriage is driven for movement, particularly in the case of the hybrid type, there is produced a keen, harsh noise attributable to the vibration of the rotor of the step motor. Also, when the carriage is started, stopped and reversed, that is, when the step motor is started, stopped and reversed, there is produced a great noise "bang" because the step motor is started or stopped while vibrating. These noises pose a problem in a printer like an ink jet printer such as a bubble jet printer which produces very little noise.

Also, it is conceivable to use the aforementioned brushless motor as a carriage driving motor, but the brushless motor takes a long rising time during starting and is not suitable as a carriage driving motor which repeats starting, stoppage and reverse starting substantially for each line, and the use of the brushless motor cannot accomplish high-speed recording.

So, in U.S. Pat. No. 4,928,050, there is proposed a recording apparatus which uses a step motor as a drive source to move a recording head for recording scanning and which is provided with detecting means for detecting the rotational angular position of the rotor of said step motor, and control means for closed-loop-controlling the driving of said step motor in conformity with the result of the detection by said detecting means. In the closed loop control of this step motor, an encoder is mounted on the rotary shaft of the step motor, and the output signals of the encoder are counted, and when a predetermined count value is reached, a motor energization signal is changed over to thereby affect the control of the rotation of the step motor. For example, assuming that an encoder capable of outputting a signal of 288 pulses per one full rotation is mounted on a PM type step motor which makes one full rotation by 48 steps, there is obtained an encoder signal of 6 pulses per step. Accordingly, it is possible to rotate the step motor by changing over the energization signal for the step motor each time 6 pulses of the encoder signal are counted.

The reason why the step motor is thus controlled by closed loop is that chiefly by the closed loop control, the harsh noise attributable to the vibration of the rotor of the step motor during the driving for movement of the carriage when the step motor is driven and the great vibration sound produced when the carriage is started or stopped and reversed are prevented from occurring.

However, to closed-loop-control the step motor in the above-described example of the prior art, the encoder must be mounted within the motor to obtain a signal resulting from the rotation of the rotor, and this has led to an increased volume of the motor. Now that in recording apparatuses such as latest printers whose compactness and thinness are progressing, compactness and thinness are also required of motors for driving recording heads, such an increased volume of the motor has posed a serious problem.

Also, multicolor has recently been adopted in recording apparatuses, and where multicolor is adopted, it is necessary that the control of the printing position be affected highly accurately and where an encoder is mounted within the motor, there has been a limit in the detection of the printing position.

SUMMARY OF THE INVENTION

It is an object of the present invention to eliminate the problems as noted above and to provide a recording apparatus of high reliability which is compact and thin as well as quiet.

It is another object of the present invention to affect the switching of a motor energization current and the detection of the position of a carriage by detecting means (a linear encoder) mounted externally of a carriage driving motor.

Further objects of the present invention will become apparent from the following detailed description of some specific embodiments of the invention.

DESCRIPTION OF THE PREFERRED EMBODIMENTS

Some embodiments of the present invention will hereinafter be described in detail with reference to the drawings.

Figure 1:
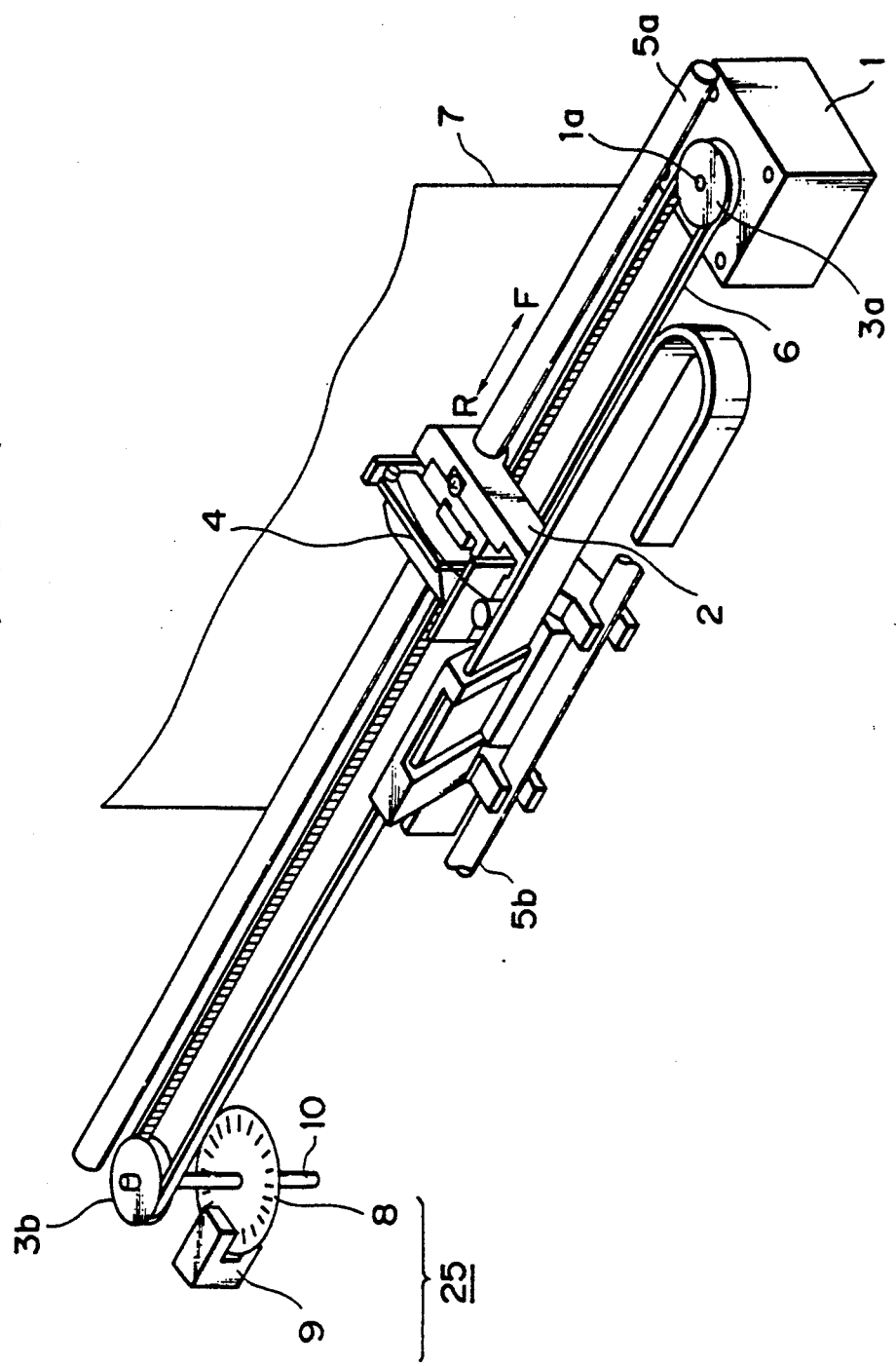
FIG. 1 is a perspective view showing the construction of the carriage driving portion of a first embodiment of the present invention.

Referring to FIG. 1 which shows the structure of the carriage driving mechanism of a serial printer according to a first embodiment of the present invention, the reference numeral 2 designates a carriage reciprocally movable in predetermined directions to recording-scan a recording head 4. The carriage 2 carries the recording head 4 thereon and is supported on guide shafts 5 for sliding movement in the axial direction thereof. A timing belt 6 is coupled to the carriage 2, and this timing belt 6 is extended between a pair of pulleys 3a and 3b, one of which, 3a, is coupled to the output rotary shaft (hereinafter referred to as the rotor shaft) 1a of a carriage driving motor (step motor) 1.

By the rotation of the carriage driving motor 1, the carriage 2 slides on the guide shafts 5 in the direction of arrow F or R in FIG. 1 along recording paper 7 through a transmission mechanism provided by the pulleys 3a, 3b and the timing belt 6. While the carriage 2 moves once in the direction F or R, the recording head 4 is driven in response to an input signal, whereby visual information such as characters and images is recorded on the recording paper 7. The recording head 4 may be of any one of various recording types such as the liquid jet type, the heat transfer type and the wire dot type.

The reference numeral 25 denotes an encoder for detecting the amount of rotation of the carriage driving motor 1. In the present embodiment, the encoder 25 is constituted by a disk-shaped encoder slit 8 coupled to the rotary support shaft 10 of the pulley 3b forming a pair with the pulley 3a coupled to the rotor shaft 1a of the motor, and a photointerrupter 9. The photointerrupter 9 detects the number of slits which pass it. That is, the encoder slit 8 is coupled to the rotor shaft 1a of the carriage driving motor 1 through the pulley 3b, the belt 6 and the pulley 3a and can therefore detect the amount of rotation of the motor 1 and the rotational angular position of the motor by the output signal of the photointerrupter 9 of the encoder 25. Moreover, usually the reduction ratio between the pulley 3a and the pulley 3b is 1, i.e., equal speed, and therefore, the amount of rotation of the motor 1 can be directly detected by the encoder 25.

Also, as described above, the encoder slits 8 are fixed to the rotary support shaft 10 of the pulley 3b which extends toward the lower portion of the printer. In the serial printer, the volume the carriage driving motor 1 occupies in the printer is large, and is a factor which particularly determines the height of the printer. Accordingly, by the encoder 25 which has heretofore increased the length (height) of the motor 1 being disposed below the pulley 3b spaced apart from the motor 1 leaving a free space as in the present embodiment, the height of the printer can be made small.

Now, in the present embodiment, an optical type encoder in which the presence of the slits formed in the encoder slit 8 is detected by the photointerrupter 9 is shown as the encoder 25, whereas in the present invention, this is not restrictive, but the encoder 25 may be a magnetic type encoder using, for example, an MR element, or a voltage inducing type encoder.

Also, the above-described encoder slit 8, fixedly coupled to the rotary support shaft 10 of the pulley 3b, may of course be disposed not below, but above the pulley 3b if there is a sufficient space for mounting the encoder.

Figure 2:
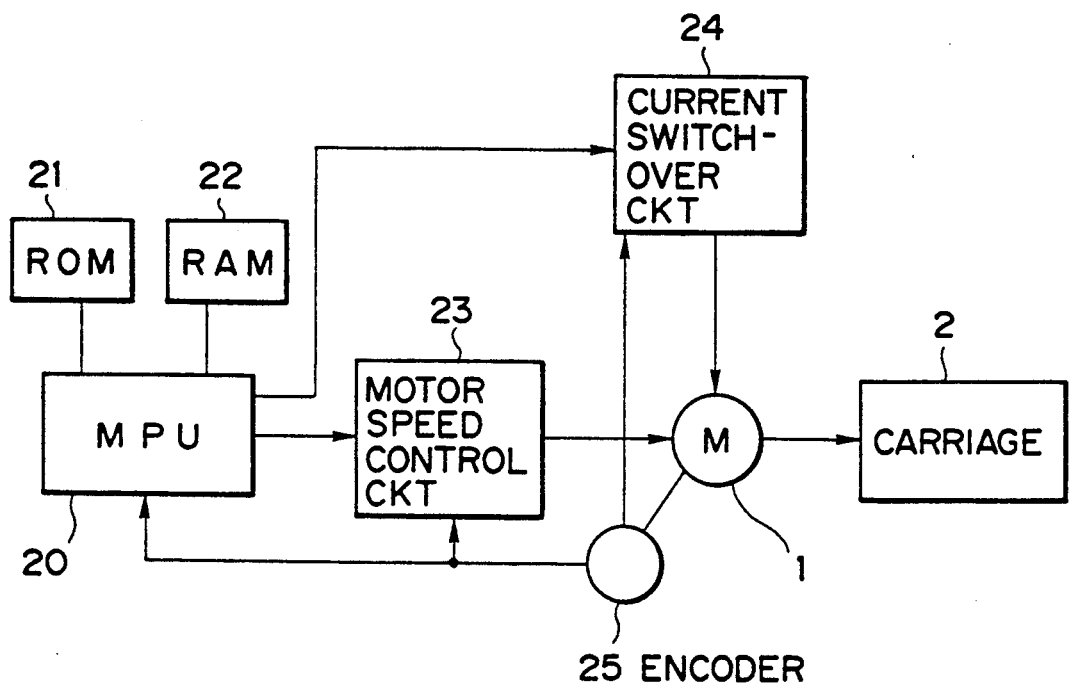
FIG. 2 is a block diagram showing the circuit construction of the motor driving control system of a recording apparatus according to the FIG. 1 embodiment of the present invention.

FIG. 2 shows the circuit construction of a motor driving control system for affecting the closed loop control of the carriage driving motor 1 of FIG. 1.

In FIG. 2, the reference numeral 20 designates an MPU (microprocessor unit) for affecting the control of the entire printer. In accordance with a control program stored in an ROM (read only memory) 21, the MPU 20 uses an RAM (random access memory) 22 for data processing to effect the drive control of a drive source for other various mechanisms, not shown, of the printer and also affect the drive control of the carriage driving motor 1 which drives the above-described carriage 2. For that purpose, the MPU 20 uses a counter by hardware or software, not shown, to count the output pulses of the above-described encoder 25 to thereby detect the position of the carriage 2.

Also, the MPU 20 controls the rotational speed of the carriage driving motor 1 to a high speed mode or a low speed mode through a motor speed control circuit 23 and affects the switching of the energization current of the carriage driving motor, and further controls the starting, the stoppage and the direction of rotation of the motor 1, i.e., the starting, the stoppage and the direction of movement of the carriage, through a current switch-over circuit 24 for driving the carriage driving motor 1.

The motor speed control circuit 23 closed-loop-controls the rotational speed of the carriage driving motor 1 in conformity with the detection output of the encoder 25, and specifically, it compares the interval time of the output pulses of the encoder 25 with a reference time, and adjusts the magnitude of the energization current of the motor 1 or the magnitude of the voltage so as to reduce or eliminate the time difference therebetween in conformity with the result of the comparison. The circuit which performs such a function is already known and therefore need not be described in detail herein.

The MPU 20 indicates the rotational speed of the carriage driving motor 1 to such motor speed control circuit 23, and in response thereto, the reference time for comparison corresponding to the speed indicated in the motor speed control circuit 23 is selected, and by the use of it, comparison with the pulse interval is affected and the rotational speed of the motor 1 is controlled, for example, to a predetermined high speed mode or a predetermined low speed mode.

On the other hand the current switch-over circuit 24 starts the switch-over of the above-described energization current in response to a starting signal input from the MPU 20 and energizes the carriage driving motor 1, and stops the carriage driving motor 1 in response to a stop signal input from the MPU 20.

Further, the current switch-over circuit 24 not only affects the driving and stoppage of the carriage driving motor 1 as described above, but also as a point concerned with the present invention, closed-loop-controls the switch-over timing of the energization current for the coil of the carriage driving motor 1 in conformity with the detection output of the encoder 25. For this purpose, the current switch-over circuit 24 has a counter, not shown, counts the output pulses of the encoder 25 by that counter, and affects the switch-over of the energization current at a point of time whereat the count value thereof coincides with a predetermined value.

In the present embodiment, the frequency of the current switch-over of the carriage driving motor 1 is e.g. 48 times per one full rotation of the rotor in terms of the single-phase-on drive system, and the number of the output pulses of the encoder 25 is 288 pulses per one full rotation. The rotor 14 rotates by an equal angle each time one pulse is output and therefore, assuming that the switch-over of the energization current is affected each time 6 (288÷48) pulses are counted, it follows that the switch-over of the energization current is affected at such a timing that the relative position of the magnetic poles of the rotor and the magnetic poles of the stator assumes the same predetermined relation at a predetermined timing whereat the rotor has rotated always by an equal angle. So, in the case of the present embodiment, the switch-over of the energization current is affected each time 6 pulses are counted. However, when the power source switch of the printer has been closed, initialization for rendering the value of the counter to 0 and adjusting the position of the rotor to a position preferable as the position for affecting the switch-over of the energization current is affected under the control of the MPU 20 so that each switch-over of the energization current may be affected at a timing in the positional relation between the magnetic poles of the rotor and stator which is suitable and preferable in driving the carriage driving motor 1 smoothly and well.

The control operation for the carriage driving motor 1 by the MPU 20 during recording will now be described with reference to FIG. 3. Here, description of the control operations for the other mechanisms by the MPU 20 is omitted. It is to be understood that a control program corresponding to the processing procedure shown in FIG. 3 is stored in the ROM 21.

Figure 3:
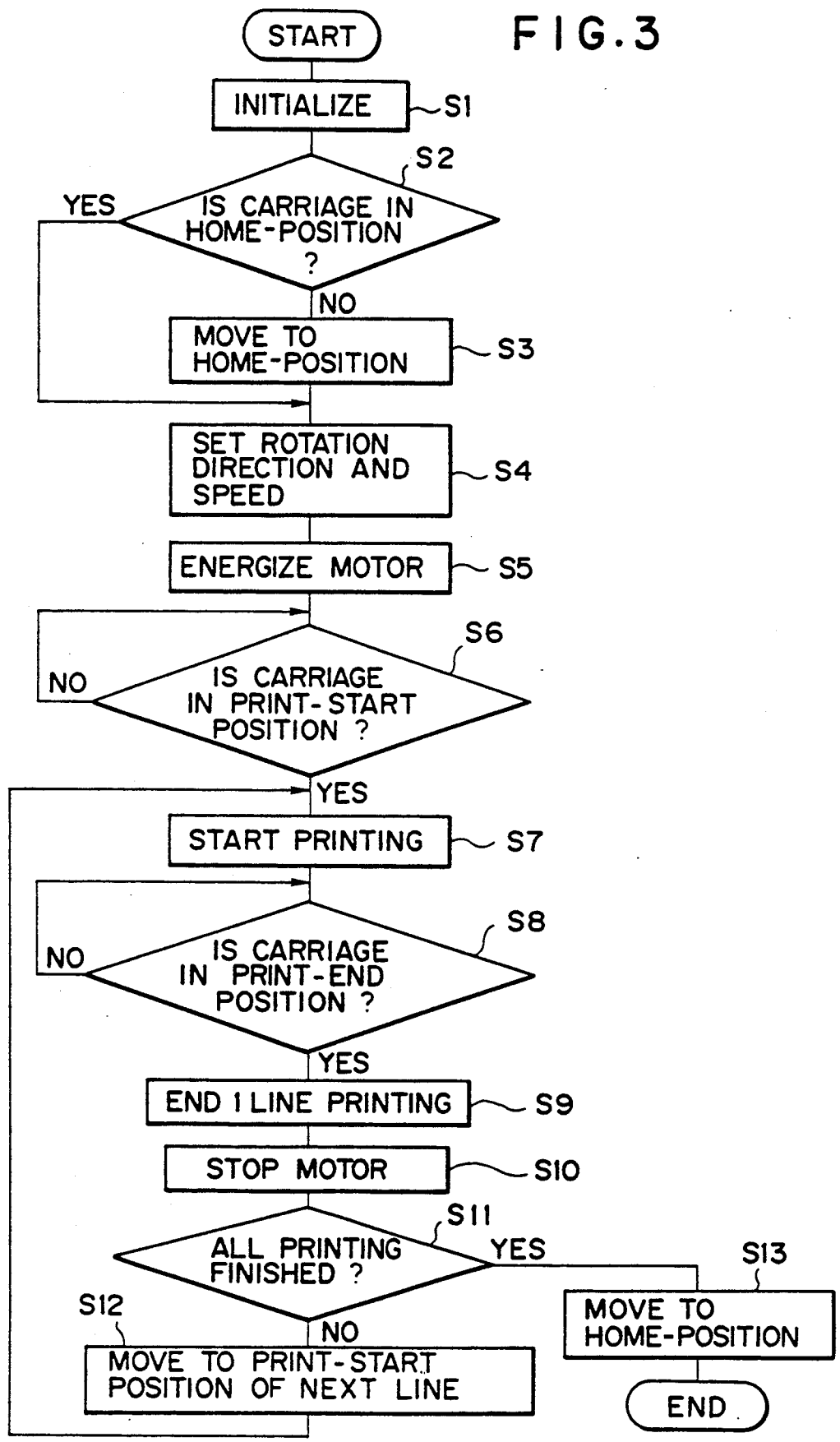
FIG. 3 is a flow chart showing the control procedure of the motor shown in FIGS. 1 and 2.

When the power source switch of the printer is closed, at the step S1 of FIG. 3, the MPU 20 performs the initializing operation for providing right correspondence between the above-described position of the rotor and the count value of the counter in the current switch-over circuit 24.

Subsequently, at a step S2, whether the carriage 2 is in the home-position which is the left end as viewed in FIG. 1 is judged, and if the carriage 2 is not in the home-position, at a step S3, the carriage driving motor 1 is driven to move the carriage 2 to the home-position. The detection of whether the carriage 2 is in the home-position is affected by an optical sensor or the like comprising, for example, a light-emitting diode and a phototransistor, although not shown.

Subsequently, at a step S4, the rotational speed and the direction of rotation of the motor 1 are determined in conformity with the recording mode indicated by a host system, not shown, and the number of the driving pulses of the carriage driving motor 1 is determined from the number of prints in one line.

Then, a signal for indicating the rotational speed of the motor to the motor speed control circuit 23 is output and also, at a step S5, the carriage driving motor 1 is energized by the driving of the current switch-over circuit 24. That is, the carriage 2 is started. Also, simultaneously with the energization of the carriage driving motor 1, the MPU 20 starts counting the output pulses of the encoder 25.

Next, at a step S6, whether the carriage 2 has arrived at the print-start position is examined by the value of the count of the output pulses of the encoder 25, and when the carriage 2 has arrived at the print-start position, at a step S7, the recording head 4 is driven to start printing.

Subsequently, at a step S8, whether the carriage 2 has arrived at the print-end position for one line is examined by the value of the count of the output pulses of the encoder 25, and when the carriage 2 has arrived at that position, at a step S9, the printing operation of the recording head 4 is stopped to end one line printing. Then at a step S10, a stop signal is output to the current switch-over circuit 24, which short-circuits the both ends of the coil of the carriage driving motor 1 in response to this signal, thereby stopping the motor 1.

Subsequently, at a step S11, the MPU 20 judges from the presence or absence of the remaining amount of print data whether all printing has been finished.

If it is judged that all printing has been finished, shift is made to a step S13, where the carriage driving motor 1 is driven to move the carriage 2 to the home-position, and thus the process is terminated.

Also, if at the step S11, it is judged that all printing has not been finished and there is print data for the next line, shift is made to a step S12, where the carriage driving motor 1 is driven to thereby move the carriage 2 to the print-start position of the next line, and return is made to the step S7, and the subsequent processing is repeated.

When reciprocal printing is to be affected, it is to be understood that the above-mentioned print-start position of the next line is the rightmost position of the print width of the next line. Also, when the carriage driving motor 1 is to be reversely rotated to move the carriage 2 in the reverse direction (the direction R in FIG. 1), of course the output pulses of the encoder 25 are subtracted and counted to thereby detect the position of the carriage 2.

As described above, according to the present embodiment, the switch-over timing of the energization current of the carriage driving motor 1 and the rotational speed of the same motor are closed-loop-controlled in conformity with the output of the encoder 25, whereby the switch-over of the energization current can always be affected at an optimum timing and also, acceleration can be sequentially affected smoothly and thus, the carriage driving motor 1 can be driven smoothly and well. Accordingly, the vibration of the carriage driving motor 1 is little and the noise during the driving thereof can be minimized. Also, when the carriage driving motor 1, is to be stopped, the motor 1 can be stopped smoothly and quickly by the above-described stopping method and the then noise can also be minimized.

Figure 4:
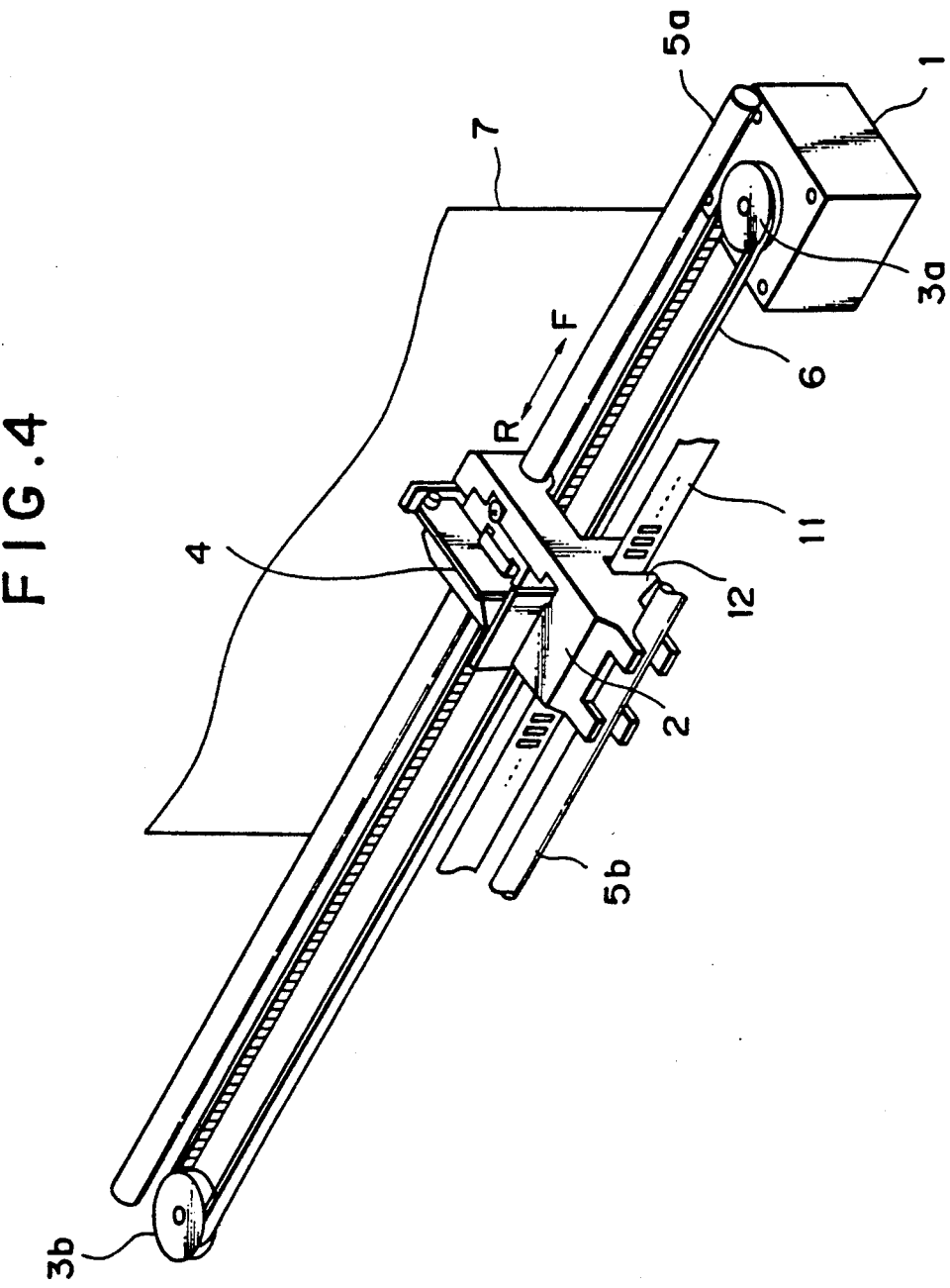
FIG. 4 is a perspective view showing the construction of the carriage driving portion of a second embodiment of the present invention.

FIG. 4 shows the construction of a second embodiment of the present invention.

The encoder 25 in the present embodiment is comprised of a straight strip-like linear encoder slit 11 and a photointerrupter 12 made integral with the carriage 2. The linear encoder slit 11 is installed parallel to the guide shaft 5b over the movement range of the carriage 2, and with the movement of the carriage 2, a slit detection signal is output from the photointerrupter 12 integrally fixed to the interior of the carriage 2.

The amount of movement of the carriage 2 and the amount of rotation of the rotor of the carriage driving motor 1 correspond to each other and therefore, by suitably selecting the slit density (resolving power) of the linear encoder slit 11, the closed loop control of the carriage driving motor 1 becomes possible.

The linear encoder slit 11 is installed straight in the space defined between the guide shaft 5b and the belt 6 as shown, for example, in FIG. 4, and the photointerrupter 12 made integral with the carriage 2 is so disposed as to be astride the linear encoder slit 11.

Again in the present embodiment, the encoder 25 is not limited to the optical type, but may be a magnetic type linear encoder on which magnetic poles are magnetized. Also, the location at which the encoder slit 11 is disposed may be between the guide shaft 5a on the opposite side and the belt 6.

Also, in the case of a color printer, the linear scale indicating the absolute position of printing is requisite to prevent the color misregistration between printed dots. In the second embodiment of the present invention, such a linear scale is used as the encoder 25 of FIG. 4 and can be used as the energization switch-over signal source of the step motor 1, and this provides a great advantage in reducing the manufacturing cost and simplifying the structure.

Figure 5:
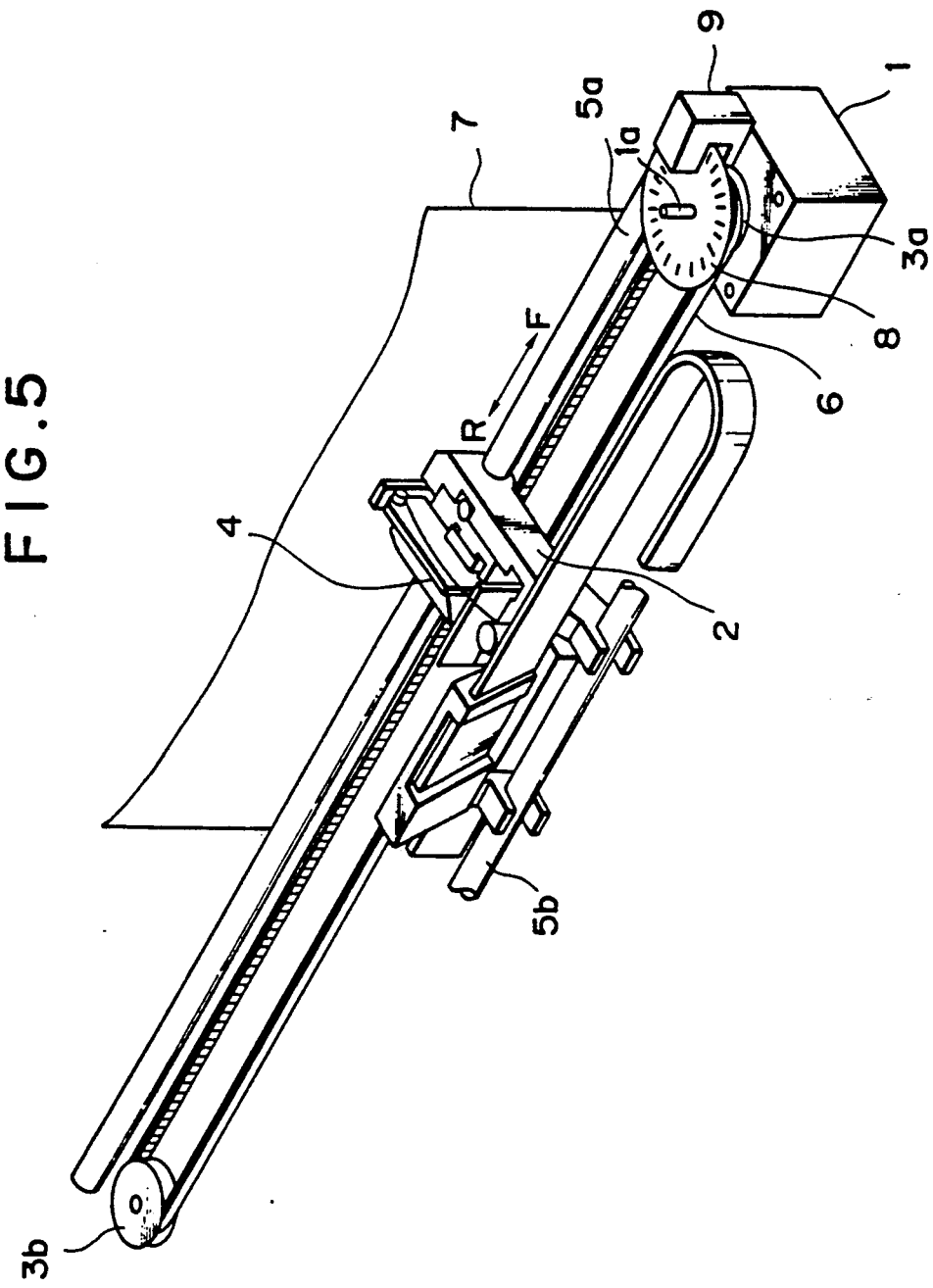
FIG. 5 is a perspective view showing the construction of the carriage driving portion of a third embodiment of the present invention.

FIG. 5 shows the construction of a third embodiment of the present invention. The encoder 25 in the present embodiment is comprised of a disk-shaped encoder slit 8 mounted on the output shaft (rotor shaft) of the carriage driving motor 1, and a slit detecting photointerrupter 9. The present embodiment, in its construction, is apparently similar to a step motor with an encoder, but differs from the latter in that the encoder 8 is disposed in the free space above the carriage driving motor 1 to thereby prevent an increase in the length of the motor. Also, the fact that the motor 1 and the encoder 25 are separated from each other leads to the advantage that a step motor generally used by an open loop can be used as the carriage driving motor 1.

As described above, according to the present invention, the amount of rotation of the rotor of the carriage driving motor is detected by the detecting means (encoder) mounted externally of the motor and the motor is closed-loop-controlled by the detection signal of the detecting means and therefore, there can be provided a recording apparatus of high reliability which is compact and thin as well as quiet.

Also, the energization current switch-over of the motor and the detection of the position of the carriage are affected by a linear encoder and therefore, highly accurate printing position control can be accomplished, and multicolor can be made suitable for the recording apparatus.

What is claimed is:

1. A recording apparatus in which the movement of a recording head of recording-scanning is affected, said apparatus comprising:
    a carriage carrying the recording head thereon;
    a step motor for moving the carriage, said step motor including a coil;
    a linear encoder for detecting the amount of movement of said carriage, said linear encoder being linearly disposed over the movable range of said carriage in a moving direction of said carriage and generating pulse signals in conformity with the amount of movement of said carriage;
    control means for determining a count value by counting the pulse signals from said linear encoder and outputting a control signal for the starting and stoppage of movement of said carriage in conformity with the count value; and
    current switch-over means for switching over and controlling an energization current supplied to said coil of said step motor in conformity with the pulse signals from said linear encoder;
    said current switch-over means starting the switch-over control of the energization current by an energization control signal from said control means, and stopping the switch-over control of the energization current by a stop control signal.

2. A recording apparatus according to claim 1, wherein said linear encoder comprises a straight strip-like linear encoder slit and a photointerrupter made integral with said carriage.

3. A recording apparatus according to claim 2, wherein said photointerrupter outputs a slit detection signal with the movement of said carriage.

4. A recording apparatus according to claim 1, wherein the pulse signals from said linear encoder are signals for indicating the printing position.

5. A recording apparatus in which the movement of a recording head for recording scanning is affected, said apparatus comprising:
    a carriage carrying the recording head thereon;
    a step motor for moving the carriage, said step motor including a coil;
    detecting means for directly detecting the amount of movement of said carriage, said detecting means generating pulse signals in conformity with the amount of movement of said carriage and being linearly disposed in a moving direction of said carriage;
    control means for determining a count value by counting the pulse signals from said detecting means and outputting a control signal for the starting and stoppage of the movement of said carriage in conformity with the count value; and
    current switch-over means for switching over and controlling an energization current applied to said coil of said step motor in conformity with the pulse signals from said detecting means;
    said current switch-over means starting the switch-over control of the energization current by an energization control signal from said control means, and stopping the switch-over control of the energization current by a stop control switch.

6. A recording apparatus according to claim 5, wherein said recording head comprises a color ink jet type recording head.

* * * * *

UNITED STATES PATENT AND TRADEMARK OFFICE
CERTIFICATE OF CORRECTION

PATENT NO. : 5,075,609
DATED : December 24, 1991
INVENTOR(S) : NORIAKI ITO, ET AL.

It is certified that error appears in the above-identified patent and that said Letters Patent is hereby corrected as shown below:

COLUMN 1:

Line 8, "affect" should read --effect--;

Line 19, "affecting" should read --effecting--;

Line 25, "an" should read --and--;

Line 27, "affected" should read --effected--;

Line 32, "affected" should read --effected--;

Line 33, "affected," should read --effected,--;

Line 35, "affect" should read --effect--;

Line 43, "affected" should read --effected--;

Line 60, "affected" should read --effected--.

COLUMN 2:

Line 26, "affect" should read --effect--;

Line 57, "affected" should read --effected--;

Line 66, affect" should read --effect--.

COLUMN 3:

Line 35, "head" should read --head 4--.

UNITED STATES PATENT AND TRADEMARK OFFICE
CERTIFICATE OF CORRECTION

PATENT NO. : 5,075,609
DATED : December 24, 1991
INVENTOR(S) : NORIAKI ITO, ET AL.

It is certified that error appears in the above-identified patent and that said Letters Patent is hereby corrected as shown below:

COLUMN 4:

Line 22, "fixedly" should read --if fixedly--;

Line 28, "affecting" should read --effecting--;

Line 31, "affecting" should read --effecting--;

Line 37, "affect" should read --effect--;

Line 46, "affects" should read --effects--.

COLUMN 5:

Line 2, "af-" should read --ef- --;

Line 6, "hand" should read --hand,--;

Line 13, "affects" should read --effects--;

Line 21, "affects" should read --effects--;

Line 32, "affected" should read --effected--;

Line 34, "affected" should read --effected--;

Line 41, "affected" should read --effected--;

Line 45, "affecting" should read --effecting--;

Line 46, "affected" should read --effected--;

Line 48, "affected" should read --effected--.

UNITED STATES PATENT AND TRADEMARK OFFICE
CERTIFICATE OF CORRECTION

PATENT NO. : 5,075,609                              Page  3  of  3

DATED       : December 24, 1991

INVENTOR(S) : NORIAKI ITO, ET AL.

It is certified that error appears in the above-identified patent and that said Letters Patent is hereby corrected as shown below:

COLUMN 6:

Line 4, "affected" should read --effected--;

Line 50, "affected," should read --effected,--;

Line 65, "affected" should read --effected--;

Line 66, "affected" should read --effected--.

COLUMN 7:

Line 67, "affected" should read --effected--.

COLUMN 8:

Line 5, "affected," should read --effected,--;

Line 40, "affected," should read --effected,--;

Line 57, "applied" should read --supplied--;

Line 64, "stop control switch." should read --stop control signal.--.

Signed and Sealed this

Twenty-ninth Day of June, 1993

Attest:

MICHAEL K. KIRK

*Attesting Officer*    *Acting Commissioner of Patents and Trademarks*